United States Patent
Tanimoto

(10) Patent No.: US 11,205,789 B2
(45) Date of Patent: Dec. 21, 2021

(54) METHOD OF STARTING OPERATION OF FUEL CELL SYSTEM

(71) Applicant: HONDA MOTOR CO., LTD., Tokyo (JP)

(72) Inventor: Satoshi Tanimoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/060,854

(22) Filed: Oct. 1, 2020

(65) Prior Publication Data
US 2021/0104758 A1    Apr. 8, 2021

(30) Foreign Application Priority Data

Oct. 2, 2019   (JP) .............................. JP2019-182065

(51) Int. Cl.
| | |
|---|---|
| H01M 8/04089 | (2016.01) |
| H01M 8/04225 | (2016.01) |
| H01M 8/04302 | (2016.01) |
| H01M 8/04537 | (2016.01) |
| H01M 16/00 | (2006.01) |
| H01M 8/04746 | (2016.01) |
| H01M 8/04082 | (2016.01) |
| H01M 8/04992 | (2016.01) |

(52) U.S. Cl.
CPC ... *H01M 8/04097* (2013.01); *H01M 8/04201* (2013.01); *H01M 8/04225* (2016.02); *H01M 8/04302* (2016.02); *H01M 8/04567* (2013.01); *H01M 8/04753* (2013.01); *H01M 8/04992* (2013.01); *H01M 16/006* (2013.01); *H01M 2250/20* (2013.01)

(58) Field of Classification Search
CPC ......... H01M 8/04097; H01M 8/04225; H01M 8/04302; H01M 8/04567; H01M 16/006
See application file for complete search history.

(56) References Cited

U.S. PATENT DOCUMENTS

2011/0111318 A1*  5/2011  Bernard ............ H01M 8/04567
                                                 429/431
2018/0342747 A1* 11/2018  Kim .................. H01M 8/04917

FOREIGN PATENT DOCUMENTS

JP          2017-152174 A     8/2017

* cited by examiner

*Primary Examiner* — Christopher P Domone
(74) *Attorney, Agent, or Firm* — Carrier Blackman & Associates, P.C.; Joseph P. Carrier; William D. Blackman

(57) ABSTRACT

When operation is to be started in a state where the SOC of a high-voltage battery has dropped, an exhaust gas recirculation pump is driven by a low-voltage battery to suck in atmosphere through an air intake valve. The atmosphere is supplied to a fuel cell stack as oxygen-containing gas, while fuel gas is supplied from a fuel tank thereto, whereby power generation is performed to thereby charge the high-voltage battery. Normal power generation of the fuel cell system is performed using the high-voltage power of the charged high-voltage battery.

5 Claims, 6 Drawing Sheets

METHOD OF STARTING OPERATION OF FUEL CELL SYSTEM

CROSS-REFERENCE TO RELATED APPLICATION

This application is based upon and claims the benefit of priority from Japanese Patent Application No. 2019-182065 filed on Oct. 2, 2019, the contents of which are incorporated herein by reference.

BACKGROUND OF THE INVENTION

Field of the Invention

The present invention relates to a method of starting operation of a fuel cell system including an air pump that supplies atmosphere, as an oxygen-containing gas, through an inlet of a cathode flow path of a fuel cell stack and an exhaust recirculation pump that circulates and supplies oxygen-containing exhaust gas (cathode off-gas) discharged from an outlet of the cathode flow path to the inlet of the cathode flow path.

Description of the Related Art

As an example, a solid polymer electrolyte fuel cell includes an electrolyte electrode assembly, for example, a membrane electrode assembly (MEA), in which an anode electrode is provided on one surface of an electrolyte membrane made of a polymer ion exchange membrane and a cathode electrode is provided on the other surface of the electrolyte membrane. The electrolyte electrode assembly, for example, the membrane electrode assembly, is sandwiched between separators to form a power generation cell (unit cell). Usually, a prescribed number of power generation cells are stacked to be incorporated in a fuel cell vehicle (fuel cell electric automobile or the like) as an in-vehicle fuel cell stack, for example.

With this fuel cell, when the power generation (operation) is stopped, the supply of the fuel gas and the oxygen-containing gas to the fuel cell is stopped, but the fuel gas remains in the anode electrode and the oxygen-containing gas remains in the cathode electrode. Therefore, there is a problem that, in a soaked state (stoppage state) where the fuel cell is stopped, the cathode side in particular is kept at a high potential and the electrode catalyst layer deteriorates.

In order to prevent this deterioration in the soaked state, a process to recirculate and discharge the oxygen-containing gas (air) remaining in the cathode flow path of the fuel cell stack, i.e. an EGR (Exhaust Gas Recirculation) process, is performed when the operation of the fuel cell is stopped. The control method of a fuel cell system disclosed in Japanese Laid-Open Patent Publication No. 2017-152174 (referred to below as JP 2017-152174A), for example, is known as technology of this type.

The fuel cell system disclosed in JP 2017-152174A includes an oxygen-containing gas supply path causing the oxygen-containing gas to flow in a manner to be supplied to the cathode of the fuel cell stack using an air pump, and an oxygen-containing exhaust gas discharge path through which the cathode off-gas discharged from the cathode is caused to flow. The oxygen-containing gas supply path is provided with an inlet stop valve, and the oxygen-containing exhaust has discharge path is provided with an outlet stop valve.

The oxygen-containing gas supply path and the oxygen-containing exhaust gas discharge path are provided with an exhaust gas recirculation path positioned between the fuel cell stack and the inlet stop valve and outlet stop valve. The exhaust gas recirculation path has disposed therein an exhaust gas recirculation pump (which will hereinafter be referred to as EGR pump).

When the stopping process is performed by the fuel cell system that includes the EGR pump, at least the outlet stop valve of the inlet stop valve and the outlet stop valve is set to the closed state, and EGR power generation is performed. With EGR power generation, the EGR pump is driven to circulate the cathode gas through the cathode flow path, and a contactor for electrically connecting the fuel cell stack and a high-voltage battery is set to a connected state to perform power generation of the fuel cell stack.

Due to this power generation, the oxygen concentration of the cathode is reduced, the nitrogen concentration increases, and the generated power of the fuel cell stack is discharged to charge the high-voltage battery, thereby reducing the voltage of the fuel cell stack and preparing for starting the next operation of the vehicle including the fuel cell system that used the power of the high-voltage battery.

SUMMARY OF THE INVENTION

However, even when the EGR power generation is performed while stopped and the high-voltage battery is able to be charged with power, if the vehicle including the fuel cell system has been left without generating power for a long time, i.e. if this vehicle has been in the soaked state for a long time, the SOC is reduced due to self-discharge of the high-voltage batter and the air pump cannot be rotated, which leads to a problem that starting of operation of the fuel cell system and starting of operation of the vehicle cannot be performed.

The present invention has been devised taking into consideration the aforementioned problem, and has the object of providing a method of starting operation of a fuel cell system making it possible to start operation of the fuel cell system even in a state where the SOC of the high-voltage battery is low enough that the air pump cannot be rotated so that the supply of oxygen-containing gas by the air pump becomes impossible whereby it becomes impossible to start operation of the fuel cell system and thus impossible to start operation of the vehicle.

One aspect of the present invention is a method of starting operation of a fuel cell system including an exhaust gas recirculation pump provided in an exhaust gas recirculation path that allows an oxygen-containing exhaust gas to circulate from an outlet of a cathode flow path of a fuel cell stack to an inlet of the cathode flow path, wherein there are provided a high-voltage battery, an air pump, a low-voltage battery, and a fuel tank, the method of starting operation of the fuel cell system, including: a step of detecting an open circuit voltage of the high-voltage battery when operation of the fuel cell system is started; a power generation start step of, when the detected open circuit voltage is less than a threshold voltage at which the air pump is able to be driven, driving the exhaust gas recirculation pump by the low-voltage battery to suck in atmosphere, supplying the atmosphere to the fuel cell stack as oxygen-containing gas, and supplying fuel gas to the fuel cell stack from the fuel tank, thereby starting power generation; a power generation continuation step of continuing the power generation by using the exhaust gas recirculation pump until the open circuit voltage of the high-voltage battery becomes the threshold voltage; and a main power generation step of, when the open circuit voltage of the high-voltage battery has become the threshold voltage, stopping the exhaust gas recirculation pump, driving the air pump by the high-voltage battery, and supplying oxygen-containing gas needed for power generation of the fuel cell stack from the air pump.

According to the present invention, when operation is to be started in a state where the SOC of the high-voltage battery drops to a point where the air pump cannot be rotated, such that it becomes impossible to supply oxygen-containing gas with the air pump so that operation of the fuel cell system and thus operation of the fuel cell vehicle cannot be started, the exhaust gas recirculation pump is driven by the low-voltage battery to suck in atmosphere. The atmosphere is supplied to the fuel cell stack as oxygen-containing gas, and the fuel gas is supplied thereto from the fuel tank, whereby power generation is performed to thereby charge the high-voltage battery. Therefore, it is possible to implement normal power generation of the fuel cell system using the high voltage power of the charged high-voltage battery.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Preferred embodiments of a method of starting operation of the fuel cell system according to the present invention will be presented and described in detail below, with reference to the accompanying drawings.

Embodiments

Figure 1:
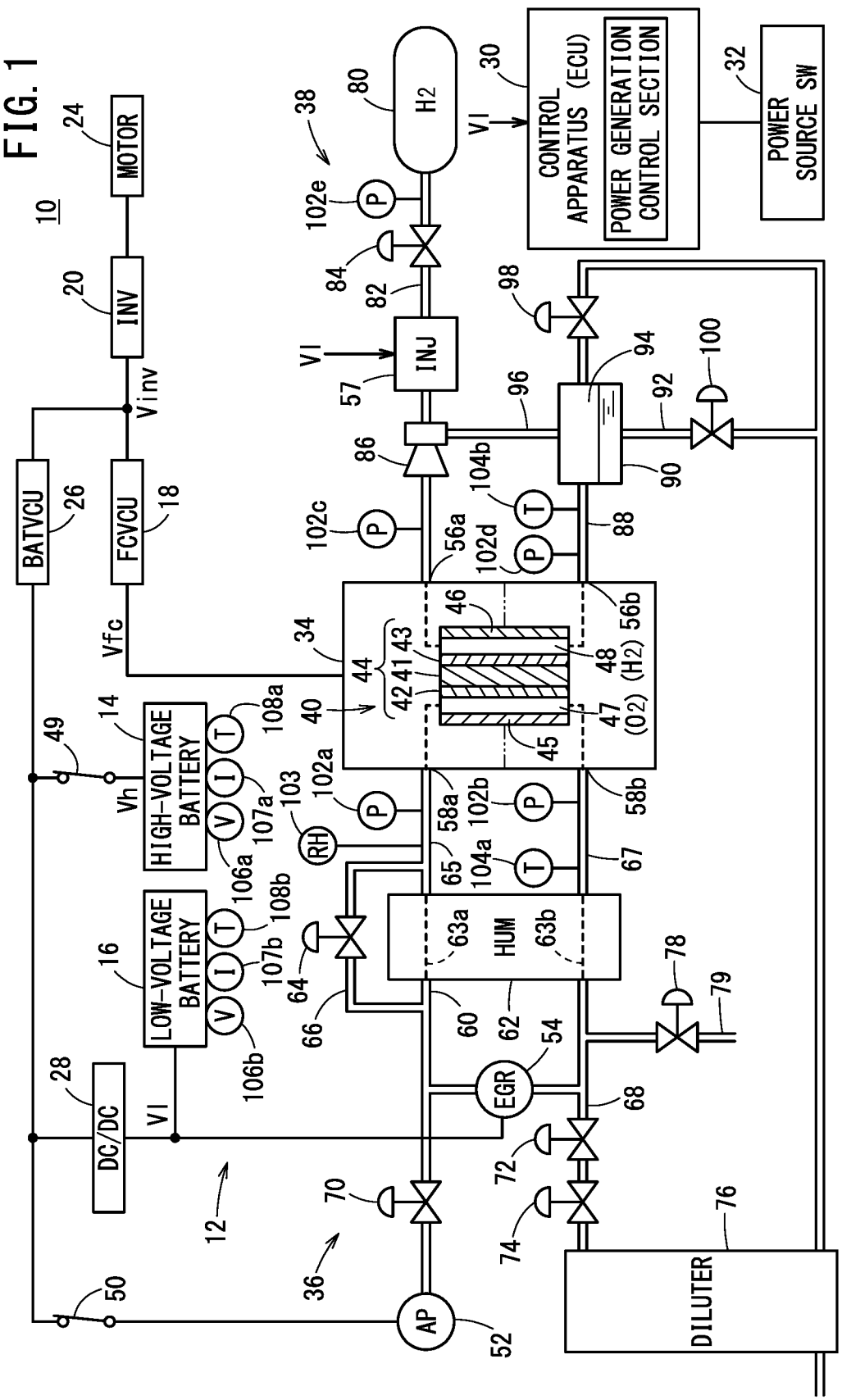
FIG. 1 is a block diagram showing an example of a configuration of a vehicle (fuel cell vehicle) in which is loaded a fuel cell system according to the present embodiment for which a method of starting operation of the fuel cell system according to the present embodiment is implemented.

[Configuration]
FIG. 1 is a block diagram showing an example of a configuration of a vehicle (fuel cell vehicle) 10 in which is loaded a fuel cell system 12 according to the present embodiment for which the method of starting operation of the fuel cell system according to the present embodiment is implemented.

As shown in FIG. 1, the fuel cell vehicle 10 is a fuel cell electric automobile, for example.

The fuel cell vehicle 10 includes, in addition to the fuel cell system 12, a high-voltage battery (high-voltage power storage apparatus) 14 that generates a high voltage Vh of approximately hundreds of volts, a low-voltage battery (low-voltage power storage apparatus) 16 that generates a low voltage Vl, e.g. +12 [V], that is approximately tens of volts or less and lower than the voltage of the high-voltage battery 14, a boost converter (FCVCU: Fuel Cell Voltage Control Unit) 18, an inverter (drive apparatus of a rotating electric machine) 20, a motor (rotating electric machine for driving the vehicle) 24, a buck-boost (bidirectional) converter (BATVCU: Battery Voltage Control Unit) 26, a buck converter (DC/DC converter) 28, a control apparatus (ECU) 30, and a power source switch (power source SW) 32.

The control apparatus 30 is formed by an ECU (Electronic Control Unit), operates as a power generation control section, various function control sections, and the like by having a CPU execute a program stored in a memory connected to this CPU, and performs integrated control of each configurational element of the fuel cell vehicle 10 that includes the fuel cell system 12, via control lines (including wirelessly) that are not shown in the drawings.

The fuel cell system 12 includes a fuel cell stack (fuel cell) 34, an oxygen-containing gas supply apparatus 36, and a fuel gas supply apparatus 38.

The oxygen-containing gas supply apparatus 36 supplies the fuel cell stack 34 with an oxygen-containing gas, and the fuel gas supply apparatus 38 supplies the fuel cell stack 34 with a fuel gas.

The fuel cell stack 34 includes a plurality of stacked power generation cells 40. The power generation cells 40 include a membrane electrode assembly 44 and separators 45 and 46 sandwiching the membrane electrode assembly 44.

The membrane electrode assembly 44 includes a solid polymer electrolyte membrane 41 that is a thin film made of perfluorosulfonic acid containing water, and a cathode electrode 42 and anode electrode 43 that sandwich the solid polymer electrolyte membrane 41.

The cathode electrode 42 and the anode electrode 43 include a gas dispersion layer (not shown in the drawings) made of carbon paper or the like. An electrode catalyst layer (not shown in the drawings) is formed by uniformly depositing porous carbon particles carrying a platinum alloy on the surface thereof onto the surface of a gas diffusion layer. The electrode catalyst layer is formed on both sides of the solid polymer electrolyte membrane 41.

A cathode flow path (oxygen-containing gas flow path) 47, which causes an oxygen-containing gas inlet communication port 58a and an oxygen-containing gas outlet communication port 58b to be in communication, is formed on the surface of the one separator 45 facing the membrane electrode assembly 44.

An anode flow path (fuel gas flow path) 48, which causes a fuel gas inlet communication port 56a and a fuel gas outlet communication port 56b to be in communication, is formed on the surface of the other separator 46 facing the membrane electrode assembly 44.

The output of the stacked power generation cells 40, i.e. the output of the fuel cell stack 34 (power generation output of a high-voltage power generation voltage Vfc), is controlled by the control apparatus 30 to be supplied to the motor 24 through the boost converter 18 and the inverter 20, to be capable of charging the high-voltage battery 14 through the boost converter 18, the buck-boost converter 26 (functioning as a buck converter), and a contactor 49.

Furthermore, the output of the fuel cell stack 34 (generated power of the power generation voltage Vfc) is capable of charging the low-voltage battery 16, through the boost converter 18, the buck-boost converter 26 (functioning as a buck converter), and the buck converter 28.

The high-voltage Vh power of the high-voltage battery 14 is capable of driving the motor 24, through the buck-boost converter 26 (functioning as a boost converter) and the inverter 20, during starting of the operation (during startup) when the power source switch 32 transitions from the OFF state to the ON state or during acceleration when an acceleration manipulation is made while the fuel cell vehicle 10 is travelling.

The regenerative power of the motor 24 during deceleration charges the high-voltage battery 14, through the inverter 20 and the buck-boost converter 26 (functioning as a buck converter).

Furthermore, the high-voltage Vh power of the high-voltage battery 14 is capable of driving an air pump (AP or air compressor) 52, through the contactors 49 and 50.

The low-voltage Vl power of the low-voltage battery 16 is supplied to an exhaust gas recirculation pump (EGR pump) 54, an injector 57, the control apparatus 30, various electromagnetic valves that are described below, an air conditioner (not shown in the drawings), and the like.

In the present embodiment, the EGR pump 54 is a pump with a variable capacity that can rotate forward and backward (in reverse), specifically a vane pump.

The fuel cell stack 34 is provided with the fuel gas inlet communication port 56a and the fuel gas outlet communication port 56b for supplying the fuel gas (e.g. hydrogen gas) to the anode electrode 43 through the anode flow path 48.

The fuel cell stack 34 is provided with the oxygen-containing gas inlet communication port 58a and the oxygen-containing gas outlet communication port 58b for supplying the oxygen-containing gas (e.g., air gas) to the cathode electrode 42 through the cathode flow path 47.

The fuel cell stack 34 is provided with a coolant inlet communication port (not shown in the drawings) and a coolant outlet communication port (not shown in the drawings) allowing coolant (not shown in the drawings) to flow to each power generation cell 40.

In the oxygen-containing gas supply apparatus 36, the air pump 52 that sucks in and compresses air from the atmosphere and supplies this air to the fuel cell stack 34 as the oxygen-containing gas is arranged in an oxygen-containing gas supply path 60.

The oxygen-containing gas supply path 60 is provided with a humidifier (HUM) 62 and a bypass path 66 that bypasses the humidifier 62 through a bypass valve 64.

The oxygen-containing gas supply path 60 is in communication with the oxygen-containing gas inlet communication port 58a of the fuel cell stack 34, through the humidifier 62 and an oxygen-containing gas supply path 65.

The oxygen-containing gas outlet communication port 58b is in communication with an oxygen-containing exhaust gas discharge path 68, through an oxygen-containing exhaust gas discharge path 67 and the humidifier 62. The EGR pump 54 is provided between the oxygen-containing exhaust gas discharge path 68 and the oxygen-containing gas supply path 60.

The EGR pump 54 causes a portion of the oxygen-containing exhaust gas (cathode off-gas) that is gas discharged from the oxygen-containing gas outlet communication port 58b to flow (return) to the oxygen-containing gas inlet communication port 58a side.

An inlet stop valve 70 is arranged on the oxygen-containing gas supply path 60 side of the air pump 52.

The oxygen-containing exhaust gas discharge path 68 is provided with an outlet stop valve 72, and is in communication with a diluter 76 through a back pressure control valve 74, downstream from the outlet stop valve 72.

The oxygen-containing exhaust gas discharge path 68 is provided with an air intake valve 78 that is opened when introducing the atmosphere from the oxygen-containing gas introduction path 79.

The fuel gas supply apparatus 38 includes a high-pressure hydrogen tank (accumulator) 80 that stores high-pressure hydrogen, and the hydrogen tank 80 is in communication with the fuel gas inlet communication port 56a of the fuel cell stack 34 via a fuel gas supply path 82. The fuel gas supply path 82 is provided with a cutoff valve 84, the injector 57 for flow rate adjustment, and an ejector 86, in the stated order in the direction of the hydrogen gas flow.

The fuel gas outlet communication port 56b of the fuel cell stack 34 is in communication with the fuel exhaust gas path 88. The fuel exhaust gas path 88 is connected to a gas-liquid separator 90, and the gas-liquid separator 90 is provided with a drain path 92 for discharging the liquid component (liquid water) and a gas path 94 for discharging the gaseous component that includes hydrogen and nitrogen. The gas path 94 is connected to an ejector 86 through a circulation path 96, and is in communication with the diluter 76 when a purge valve 98 is opened. The drain path 92 is in communication with the diluter 76 through a drain valve 100.

The diluter 76 has a function to mix together the fuel exhaust gas (anode off-gas containing hydrogen gas) discharged from the fuel gas outlet communication port 56b of the fuel cell stack 34 and the oxygen-containing exhaust gas (cathode off-gas containing oxygen) discharged from the oxygen-containing gas outlet communication port 58b of the fuel cell stack 34, to dilute the hydrogen concentration of the mixed gas to be less than or equal to a specified value.

Pressure gauges 102a, 102b, 102c, 102d, and 102e are arranged respectively on the outlet sides of the oxygen-containing gas supply path 65, the oxygen-containing exhaust gas discharge path 67, the fuel gas supply path 82, the fuel exhaust gas path 88, and the hydrogen tank 80. A humidity gauge 103 is arranged in the oxygen-containing gas supply path 65. Thermometers 104a and 104b are arranged in the oxygen-containing exhaust gas discharge path 67 and the fuel exhaust gas path 88.

Voltmeters 106a and 106b, ammeters 107a and 107b, and thermometers 108a and 108b are each arranged respectively in the high-voltage battery 14 and the low-voltage battery 16. Voltmeters, ammeters, and thermometers (not shown in the drawings) are also arranged in the electrical circuits such as the boost converter 18, the buck-boost converter 26, the buck converter 28, and the inverter 20.

[Normal Operation of the Fuel Cell System 12 During Travel or the Like]

The following describes normal operation (normal power generation operation) of the fuel cell system 12 during travel of the fuel cell vehicle 10 that is basically formed in the manner described above, while referencing FIG. 2 in which the flows of the fuel gas, the oxygen-containing gas, and power are indicated by arrows.

During normal operation, the oxygen-containing gas (air) is sent to the oxygen-containing gas supply path 60 from the air pump 52 that operates using the high-voltage Vh power. This oxygen-containing gas passes through the humidifier 62 and is then humidified, or bypasses the humidifier 62 through the bypass path 66, and is then supplied to the oxygen-containing gas inlet communication port 58a of the fuel cell stack 34.

The humidifier 62 includes a flow path 63a through which the oxygen-containing gas (dried air) flows and a flow path 63b through which the exhaust gas (wet oxygen-containing exhaust gas, cathode off-gas) from the oxygen-containing gas outlet communication port 58b of the fuel cell stack 34 flows via the oxygen-containing exhaust gas discharge path 67 and the oxygen-containing gas outlet communication port 58b of the fuel cell stack 34. Further, the humidifier 62 has a function to humidify oxygen-containing gas supplied from the air pump 52. Essentially, the humidifier 62 causes the water contained in the cathode off-gas to move to the supply gas (oxygen-containing gas) through the porous film.

The degree of humidity at this time is set to be a humidity amount enabling favorable realization of the power generation capability in the fuel cell stack 34, by humidifying the solid polymer electrolyte membrane 41. The setting of the humidity amount is performed by controlling the opening amount of the bypass valve 64 with the control apparatus 30 in consideration of the humidity gauge 103.

On the other hand, in the fuel gas supply apparatus 38, the hydrogen gas (fuel gas) is supplied to the fuel gas supply path 82 from the high-pressure hydrogen tank 80, due to the injector 57 being opened. This hydrogen gas is mixed together with the anode off-gas sucked into the ejector 86 through the circulation path 96, then passes through the ejector 86, and is then supplied to the fuel gas inlet communication port 56a of the fuel cell stack 34.

In the fuel cell stack 34, the oxygen-containing gas is supplied to the cathode electrode 42 from the oxygen-containing gas inlet communication port 58a, through the cathode flow path 47 of each power generation cell 40. On the other hand, the hydrogen gas is supplied to the anode electrode 43 from the fuel gas inlet communication port 56a, through the anode flow path 48 of each power generation cell 40. Accordingly, in each power generation cell 40, the oxygen-containing gas contained in the air supplied to the cathode electrode 42 and the hydrogen gas supplied to the anode electrode 43 are consumed in an electrochemical reaction within the electrode catalyst layer, thereby realizing power generation.

Next, the cathode off-gas and the reaction product water formed from the air supplied to the cathode electrode 42 and consumed are discharged to the oxygen-containing gas outlet communication port 58b, flow through the oxygen-containing exhaust gas discharge path 68, and are introduced to the diluter 76. Similarly, the hydrogen gas supplied to the anode electrode 43 and consumed is discharged to the fuel gas outlet communication port 56b as the anode off-gas (a portion of which is consumed fuel gas). The anode off-gas is introduced to the gas-liquid separator 90 from the fuel exhaust gas path 88 and has the liquid component (liquid water) removed therefrom, and is then sucked into the ejector 86 from the gas path 94, through the circulation path 96.

The power of the high-voltage power generation voltage Vfc generated by the fuel cell stack 34, in which the plurality of power generation cells 40 are electrically connected in series, is converted into high-voltage (drive voltage) Vinv power in order to achieve the torque needed for the motor 24 via the boost converter 18, and then supplied to the input side of the inverter 20.

The inverter 20 has its duty controlled based on the opening amount of the accelerator (not shown in the drawing), to perform 3-phase PWM driving of the motor 24. Due to this, the fuel cell vehicle 10 travels.

In a case where the power of the power generation voltage Vfc generated by the fuel cell stack 34 is more than sufficient, this excess power charges high-voltage battery 14 having the high voltage Vh through the buck-boost converter 26 via the contactor 49, and is converted into the low-voltage V1 power to charge the low-voltage battery 16 via the buck converter 28.

The high voltage Vh power of the high-voltage battery 14 is supplied to the air pump 52 via the contactor 50.

The low voltage V1 of the low-voltage battery 16 is supplied to the control apparatus 30, the injector 57, an air conditioner (not shown in the drawings), and the like.

Each SOC (state of charge, and the full charge corresponds to 100%) of the high-voltage battery 14 and the low-voltage battery 16, is calculated by the control apparatus 30 by referencing a map (not shown in the drawings), based on the voltages detected by the voltmeters 106a and 106b, the currents detected by the ammeters 107a and 107b, and the temperatures detected by the thermometers 108a and 108b.

[Operation when the Fuel Cell Vehicle 10 is Stopped and Operation During Starting of Operation after Soaking (Stoppage)]

Figure 3:
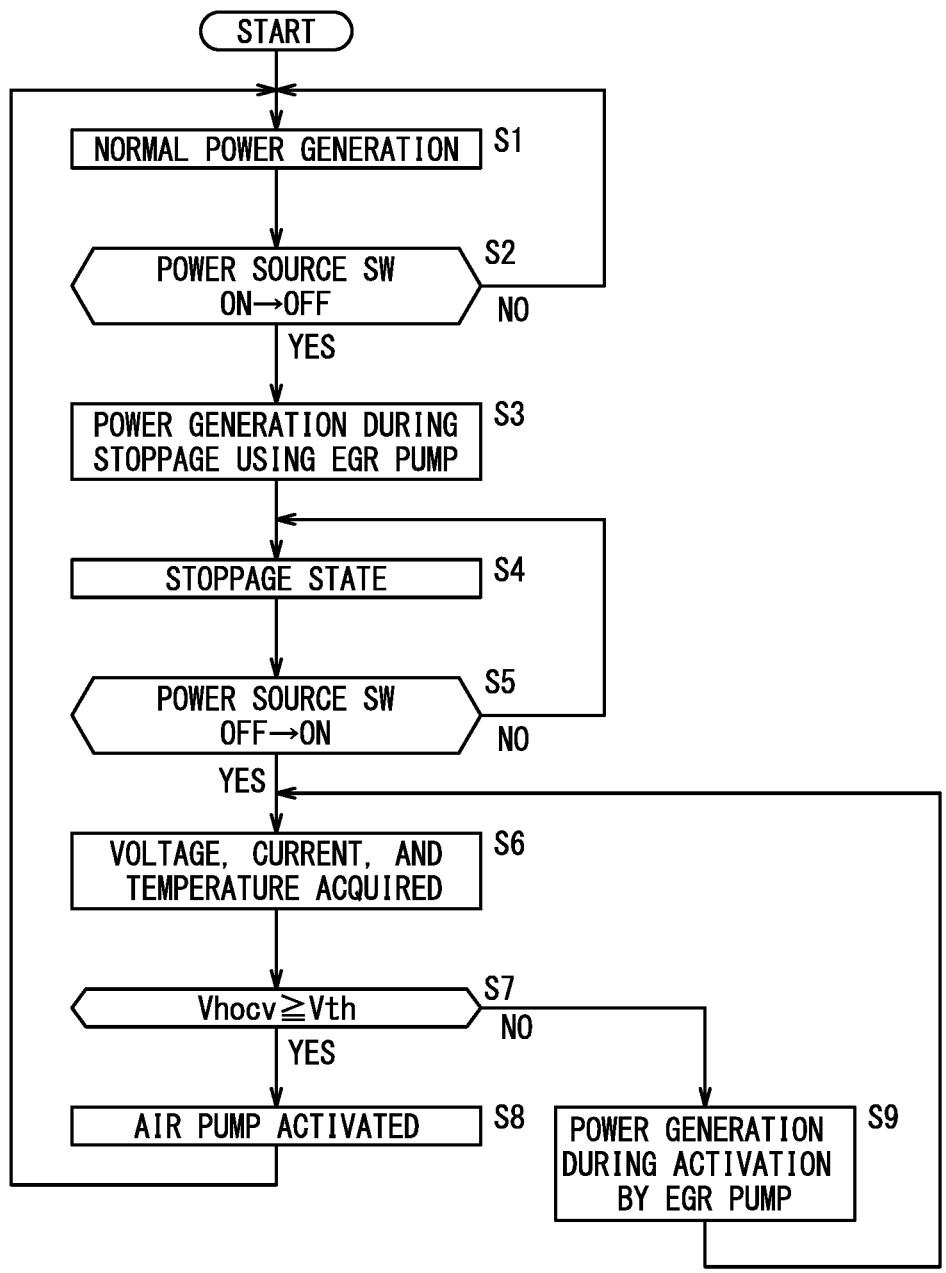
FIG. 3 is a flow chart used to describe the method of starting operation of the fuel cell system according to the present embodiment.

The above is a description of the normal operation of the fuel cell system 12 during travel or the like. The following describes a method of starting operation of the fuel cell system according to the embodiment of the present invention, as well as an operation during stoppage of the fuel cell vehicle 10 in which the fuel cell system 12 implementing this method of starting operation of the fuel cell system is loaded and an operation during starting of the operation after soaking (stoppage), while referencing the flow chart of FIG. 3. The control entity that executes the program according to the flow chart and performs drive control of each configurational element is the CPU of the control apparatus 30.

During the normal operation described above (normal power generation operation) at step S1, when the fuel cell vehicle 10 stops (when the vehicle is turned OFF) at step S2, a judgment is made concerning whether the power source switch 32 has transitioned from the ON state to the OFF state.

When it is detected that the power source switch 32 has transitioned to the OFF state (step S2: YES), at step S3, the process of stopping the fuel cell system 12 that includes the power generation process during a stop (end charge) by the EGR pump 54 is performed.

In the stopping process, the operation of the air pump 52 is stopped and the contactor 50 is opened, thereby stopping the driving of the air pump 52. Furthermore, the duty of the injector 57 for supplying the fuel gas is reduced, thereby reducing the fuel gas flow rate.

In addition, the outlet stop valve 72 is closed so that the EGR pump 54 is driven to rotate forward and the cathode off-gas expelled from the oxygen-containing gas outlet communication port 58b is circulated through the cathode flow path 47 inside the fuel cell stack 34 through the oxygen-containing gas inlet communication port 58a, and the contactor 49 for electrically connecting the fuel cell stack 34 and the high-voltage battery 14 is closed to perform the power generation of the fuel cell stack 34.

Due to this power generation, the oxygen concentration in the cathode-side circulation path drops and the nitrogen concentration increases, and the generated power of the fuel cell stack 34 is discharged to charge (end charge) the high-voltage battery 14 via the boost converter 18 and the buck-boost converter 26.

After this, the driving of the EGR pump 54 is stopped, and the contactor 49 is opened.

In this way, at step S3, the power generation voltage Vfc of the fuel cell stack 34 drops and preparation is made for starting of the next operation of the fuel cell vehicle 10 that used the power of the high-voltage battery 14.

Then, at step S4, the fuel cell vehicle 10 reaches the soaked state (stoppage state) and remains in the soaked state.

While in this soaked state (stoppage state), at step S5, monitoring is performed concerning whether the power source switch 32 has transitioned from the OFF state to the ON state.

When it is detected that the power source switch 32 has transitioned to the ON state (step S5: YES), at step S6, the high voltage Vh and the low voltage Vl of the high-voltage battery 14 and the low-voltage battery 16 are respectively acquired by the voltmeters 106a and 106b, and the temperatures Thv and the Tlv of the high-voltage battery 14 and the low-voltage battery 16 are respectively acquired by the thermometers 108a and 108b. At this time, the contactors 49 and 50 are in the open state, and therefore the high voltage Vh of the high-voltage battery 14 is measured as the open circuit voltage Vhocv.

At this step S6, the SOC of the high-voltage battery 14 is calculated based on the open circuit voltage Vhocv of the high voltage Vh and the temperature Thv, and the SOC of the low-voltage battery 16 is calculated based on the low voltage Vl and the temperature Tlv.

Next, at step S7, it is judged whether the open circuit voltage Vhocv of the high-voltage battery 14 is greater than or equal to a threshold voltage Vth at which the air pump 52 can be driven. (The threshold voltage Vth is set to a different value according to the temperature Thv. In particular, when the temperature Thv is less than or equal to the freezing point, the threshold voltage has a value that is lower than when the temperature Thv is greater than the freezing point).

If Vhocv≥Vth, that is, if the open circuit voltage Vhocv of the high-voltage battery 14 is greater than or equal to the threshold voltage Vth (step S7: YES), the high voltage is capable of driving the air pump 52, and therefore, at step S8, the contactor 50 is set to the closed state and the air pump 52 is driven. From this point onward, the normal power generation operation of step S1 is performed.

On the other hand, in the judgment of step S7, if Vhocv<Vth, that is, if the open circuit voltage Vhocv of the high-voltage battery 14 is less than the threshold voltage Vth (step S7: NO), it is judged that the air pump 52 cannot be driven by the high voltage Vh of the high-voltage battery 14, and at step S9, the power generation process during starting of the operation using the EGR pump 54 is performed, that is, the power generation of activation by EGR pump is performed.

Figure 4:
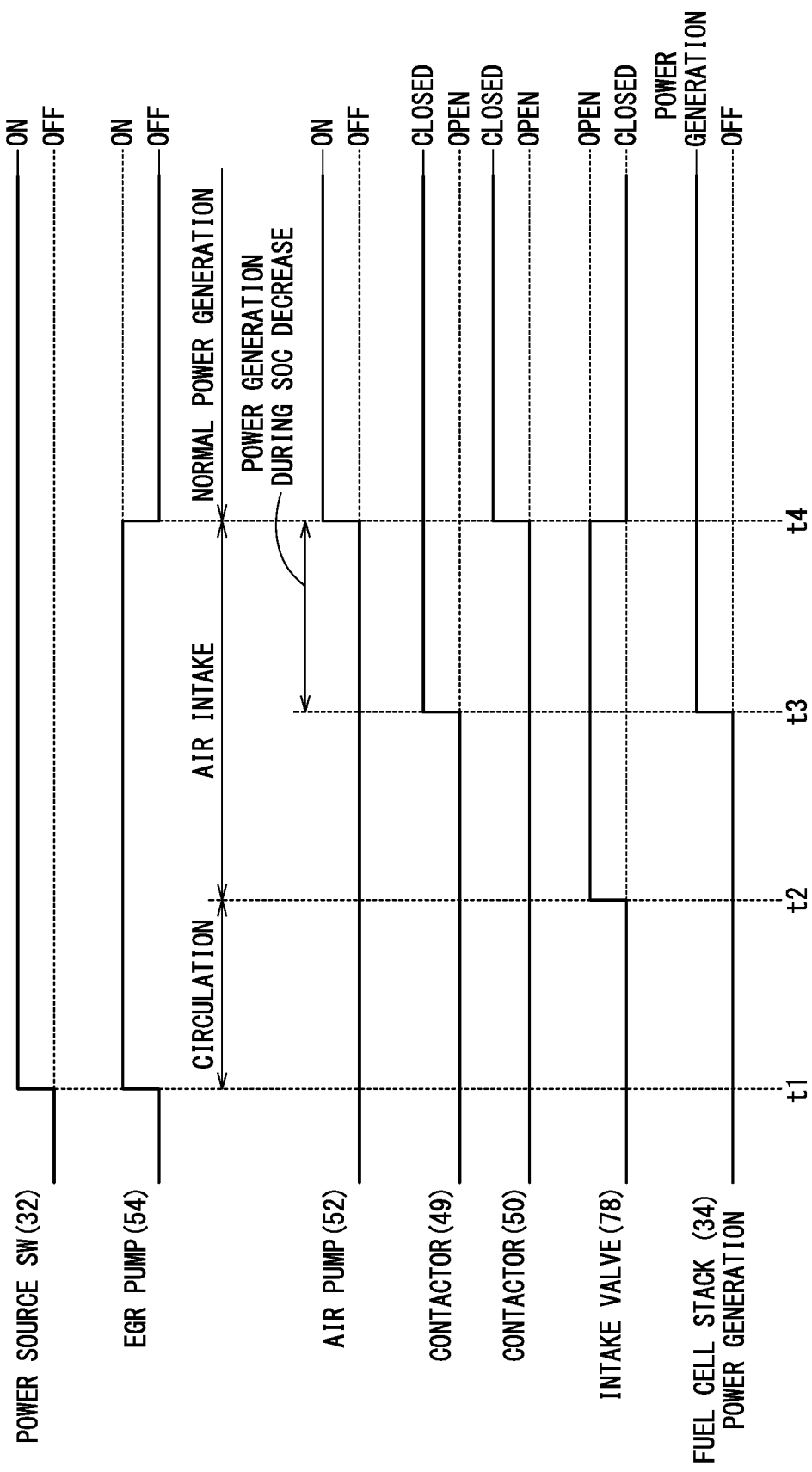
FIG. 4 is a timing chart used to describe the method of starting operation of the fuel cell system according to the present embodiment.
Figure 5:
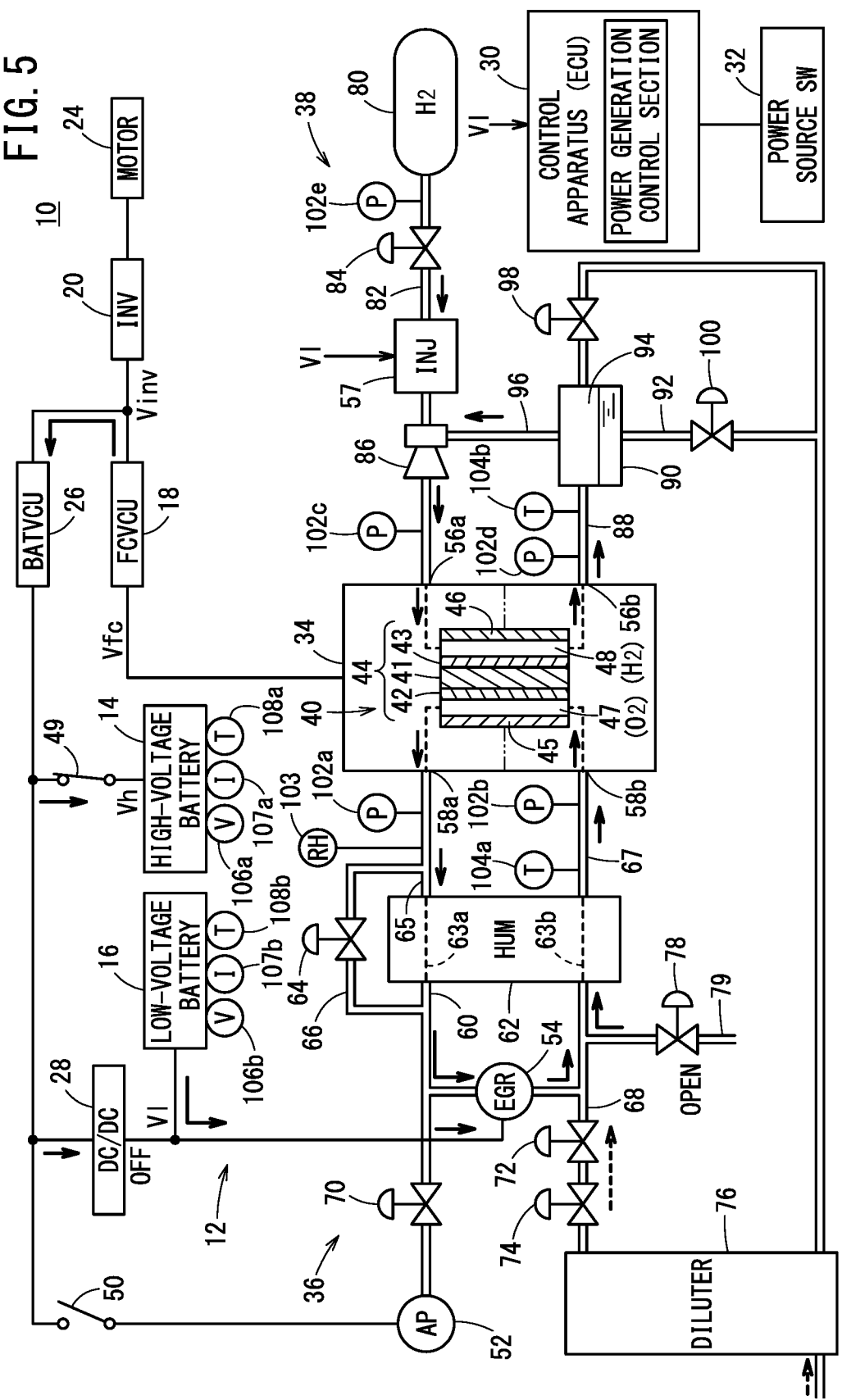
FIG. 5 is a block diagram in which are inserted arrow lines used to describe the power generation process during starting operation of the fuel cell system according to the present embodiment.

The following describes the power generation process during starting of the operation using the EGR pump 54 (the method of starting operation of the fuel cell system according to the present embodiment), while referencing the time chart of FIG. 4 and FIG. 5.

At the timing t1, if the power source switch 32 has transitioned from the OFF state to the ON state (step S5: YES), when the judgment of step S7 is negative (step S7: NO, Vhocv<Vth), with the air pump 52 in the OFF state and the air intake valve 78 in the closed state, reverse rotational driving of the EGR pump 54 is started at the timing t1. From the timing t1 to the timing t2, the internal air circulates through the cathode flow path of the fuel cell system 12 (EGR pump 54→oxygen-containing exhaust gas discharge path 67→cathode flow path 47→oxygen-containing gas supply path 65→oxygen-containing gas supply path 60→EGR pump 54), due to the reverse rotational driving of the EGR pump 54 (see FIG. 5).

When the air intake valve 78 is opened at the timing t2 at which the EGR pump 54 is rotated in reverse to circulate the internal air (cathode off-gas) in the cathode circulation path, atmosphere is sucked into the oxygen-containing exhaust gas discharge path 67 side from the oxygen-containing gas introduction path 79 through the air intake valve 78, due to the negative pressure caused by the internal air circulation, and introduced into the cathode flow path 47 from the oxygen-containing gas outlet communication port 58b, thereby increasing the oxygen concentration in the cathode flow path 47.

In the case of a system that is not provided with the air intake valve 78 and the oxygen-containing gas introduction path 79, the outlet stop valve 72 and the back pressure control valve 74 may both be opened to guide the atmosphere from the diluter 76 side. Furthermore, when the air intake valve 78 is opened, the outlet stop valve 72 and the back pressure control valve 74 may be opened at the same time.

Then, at the timing t3, the cutoff valve 84 is opened, the injector 57 is driven, the fuel gas is expelled from the hydrogen tank 80, and the fuel gas is circulated through the anode path (fuel gas supply path 82→ejector 86→anode flow path 48→fuel exhaust gas path 88→circulation path 96→ejector 86), and also, the contactor 49 of the high-voltage battery 14 is closed.

Due to this, from the timing t3 to the timing t4, the fuel gas is supplied from the hydrogen tank 80 and the power generation during starting of the operation using the EGR pump 54 (charging during the SOC decrease of the high-voltage battery 14) is performed.

More specifically, from the timing t3 to the timing t4, the high-voltage battery 14 having the decreasing SOC is charged with the generated power of the fuel cell stack 34, via the boost converter 18, the buck-boost converter 26, and the contactor 49.

While the power generation during starting of the operation of this step S9 is being performed, the charging of the high-voltage battery 14 due to the reverse rotational driving of the EGR pump 54 progresses, and monitoring is performed concerning whether the judgment of step S7 is affirmative (Vhocv≥Vth).

The internal resistance value of the high-voltage battery 14 can be estimated from the current value detected by the ammeter 107a and the high voltage Vh detected by the voltmeter 106a when the contactor 49 is closed, at the timing t3, and the open circuit voltage Vhocv detected by the voltmeter 106a while the contactor 49 is open (timing t1 to timing t3), and the open circuit voltage Vhocv of the high-voltage battery 14 from the timing t3 to the timing t4 can be estimated.

Figure 2:
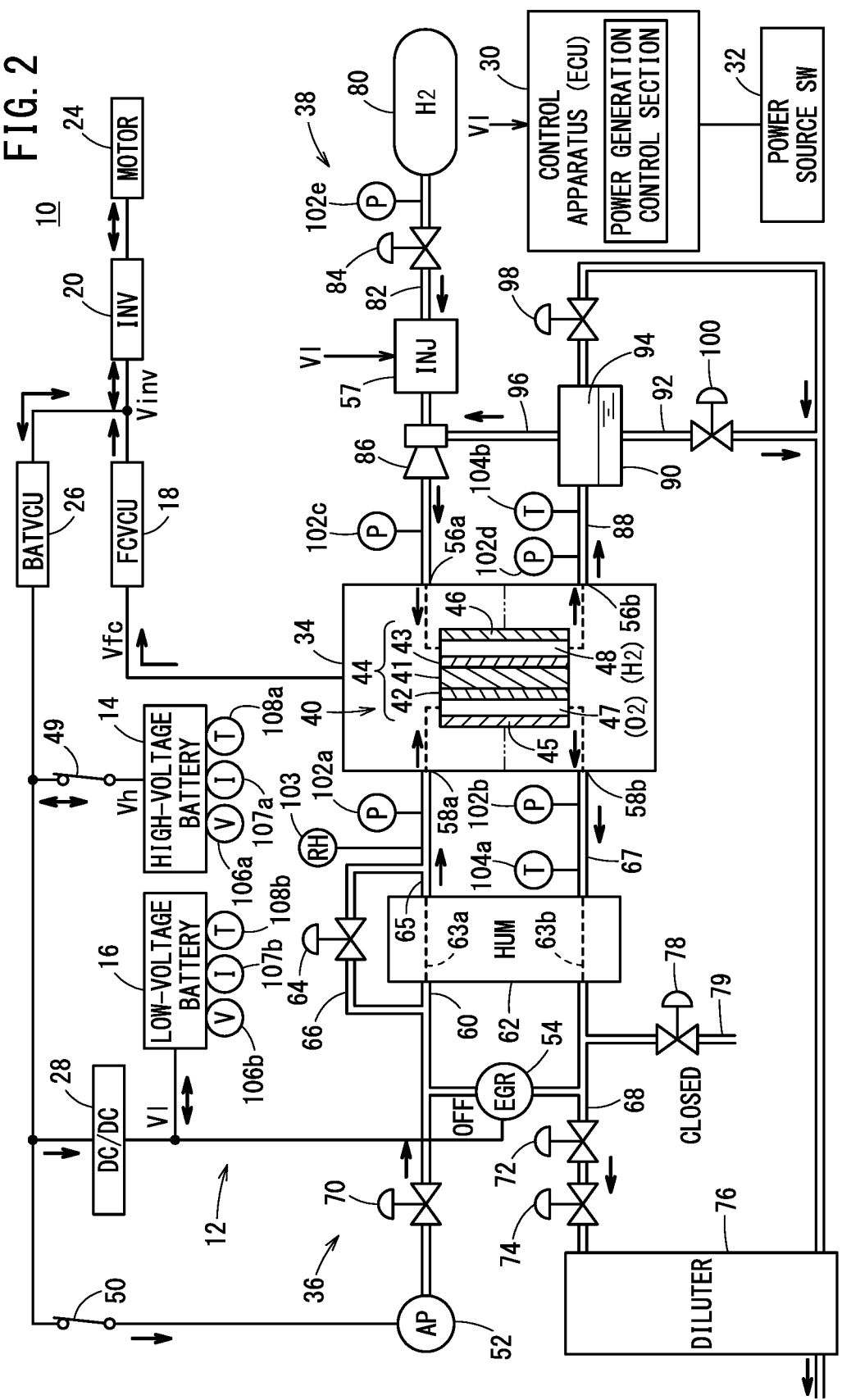
FIG. 2 is a block diagram in which are inserted arrow lines used to describe the normal power generation operation of the fuel cell system according to the present embodiment.

At the timing t4 at which the judgment of step S7 is affirmative (Vhocv≥Vth), the contactor 50 and the air intake valve 78 are closed, the air pump 52 is driven by the high-voltage Vh power of the high-voltage battery 14, and the normal power generation operation of step S1 described with reference to FIG. 2 is started.

The embodiment described above can also be modified as described below.

[Modifications]

Figure 6:
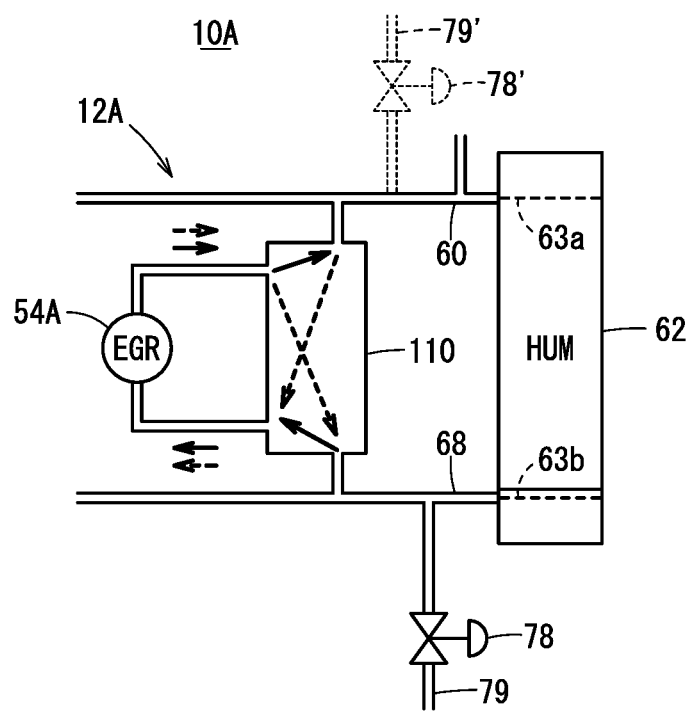
FIG. 6 is a block diagram showing essential portions of an example of a configuration of a vehicle (fuel cell vehicle) in which is loaded a fuel cell system according to a modification for which the method of starting operation of the fuel cell system according to the modification is implemented.

In a case where the EGR pump 54 is not a pump such as a vane pump that is capable of forward rotation and reverse rotation, e.g., in a case where the EGR pump 54 is a turbo pump (referred to as an EGR pump 54A) that uses an impeller, in a fuel cell vehicle 10A including a fuel cell system 12A, as shown in FIG. 6, a directional control valve 110 is provided in a tube path of the EGR pump 54A. Then, by switching the directional control valve 110 by the control apparatus 30, it is possible to cause the oxygen-containing gas to flow backward as shown in FIG. 5, even though the EGR pump 54A rotates in a single direction.

Furthermore, as shown by the thin dashed lines in FIG. 6, the air intake valve 78 may be provided as an air intake valve 78' and an oxygen-containing gas introduction path 79' on the oxygen-containing gas supply path 60 side.

However, in the fuel cell systems 12 and 12A, since the control of the back pressure is performed by the back pressure control valve 74 and the reaction product water flows due to an electrode reaction, the tube diameters of the oxygen-containing exhaust gas discharge paths 67 and 68 are greater than the tube diameters of the oxygen-containing gas supply paths 60 and 65, and therefore the air intake valve 78 is preferably provided on the oxygen-containing exhaust gas discharge path 68 side to easily suck in the atmosphere.

[Inventions Understandable from the Embodiments and Modifications]

The following is a record of inventions that can be understood from the embodiments and modifications described above. To facilitate understanding, configurational elements are given the reference numerals used above (in the embodiments and modifications) in parentheses, but these configurational elements are not limited to the elements given these reference numerals.

A method of starting operation of the fuel cell system according to the present invention is a method of starting operation of the fuel cell system (12) including an exhaust gas recirculation pump (54) provided in an exhaust gas recirculation path that allows an oxygen-containing exhaust gas to circulate from an outlet (58*b*) of a cathode flow path (47) of a fuel cell stack (34) to an inlet of the cathode flow path (47), wherein there are provided a high-voltage battery (14), an air pump (52), a low-voltage battery (16), and a fuel tank (80), and the method includes a step (step S6) of detecting an open circuit voltage (Vhocv) of the high-voltage battery (14) when operation of the fuel cell system (12) is started; a power generation start step (step S9) of, when the detected open circuit voltage (Vhocv) is less than a threshold voltage (Vth) at which the air pump (52) is able to be driven, driving the exhaust gas recirculation pump (54) by the low-voltage battery (16) to suck in atmosphere, supplying the atmosphere to the fuel cell stack (34) as oxygen-containing gas, and supplying fuel gas to the fuel cell stack from the fuel tank (80), thereby starting power generation; a power generation continuation step (S9) of continuing the power generation by using the exhaust gas recirculation pump (54) until the open circuit voltage (Vhocv) of the high-voltage battery (14) becomes the threshold voltage (Vth); and a main power generation step (step S1) of, when the open circuit voltage (Vhocv) of the high-voltage battery (14) has become the threshold voltage (Vth), stopping the exhaust gas recirculation pump (54), driving the air pump (52) by the high-voltage battery (14), and supplying the oxygen-containing gas needed for power generation of the fuel cell stack (34) from the air pump (52).

According to the present invention, when operation is to be started in a state where the SOC (linked to the open circuit voltage (Vhocv)) of the high-voltage battery (14) drops to a point where the air pump (52) cannot be rotated, such that it becomes impossible to supply oxygen-containing gas with the air pump (52) so that operation of the fuel cell system (12) and thus operation of the fuel cell vehicle (10) cannot be started, the exhaust gas recirculation pump (54) is driven by the low-voltage battery (16) to suck in atmosphere. The atmosphere is supplied to the fuel cell stack (34) as oxygen-containing gas, and the fuel gas is supplied thereto from the fuel tank (80), whereby power generation is performed to thereby charge the high-voltage battery (14). Therefore it is possible to implement normal power generation of the fuel cell system (12) using the high voltage (Vh) power of the charged high-voltage battery (14).

It is preferable that an air intake valve (78, 78') is provided in an oxygen-containing exhaust gas discharge path (68) or an oxygen-containing gas supply path (60) of the fuel cell system (12), and that the air intake valve (78 or 78') is opened to supply the oxygen-containing gas to the fuel cell stack (34) from the power generation start step (step S9) until the open circuit voltage (Vhocv) of the high-voltage battery (14) becomes the threshold voltage (Vth).

In this way, by providing the air intake valve (78, 78') in the oxygen-containing exhaust gas discharge path (68) or the oxygen-containing gas supply path (60) of the fuel cell stack (34), it is possible to supply the oxygen-containing gas to the fuel cell stack (34) without using the air pump.

Furthermore, the method may further include, before the power generation start step (timing t3 of step S9) in which the air intake valve (78, 78') is opened, a preliminary driving step (timing t1 to timing t2 of step S9) for the exhaust gas recirculation pump (54) of driving the exhaust gas recirculation pump (54), and in the preliminary driving step (timing t1 to timing t2 of step S9), the oxygen-containing gas remaining in the cathode flow path (47) may be caused to circulate.

Since the exhaust gas recirculation pump (54) is driven to circulate the oxygen-containing gas remaining in the cathode flow path (47) before opening the air intake valve (78, 78'), it becomes easy to create the negative pressure for sucking in the atmosphere.

Furthermore, when driving the exhaust gas recirculation pump (54), the exhaust gas recirculation pump (54) may be driven in a manner to circulate the oxygen-containing gas in reverse from the inlet (58*a*) of the cathode flow path (47) toward the outlet (58*b*) of the cathode flow path (47), through the exhaust gas recirculation path, until the start timing (timing t3) of the power generation continuation step (timing t3 to timing t4).

In this way, when the exhaust gas recirculation pump (54) is driven during starting of the operation, since the exhaust gas recirculation pump (54) is driven in a manner to circulate the oxygen-containing gas in reverse from the inlet (58*a*) of the cathode flow path (47) toward the outlet (58*b*) of the cathode flow path (47), through the exhaust gas recirculation path, until the start timing (timing t3) of the power generation continuation step, it is easy to suck in the atmosphere from the outlet (58*b*) side of the cathode flow path (47) to the inside of the fuel cell stack (34).

Yet further, in a case where the exhaust gas recirculation pump (54) is a type of pump incapable of reverse rotation, a directional control valve (110) is installed and the directional control valve (110) is switched in a manner to circulate the oxygen-containing gas in reverse from the inlet (58*a*) of the cathode flow path (47) toward the outlet (58*b*)

of the cathode flow path (47), through the exhaust gas recirculation path. With this configuration, it is possible to easily circulate the oxygen-containing gas in reverse from the inlet (58*a*) of the cathode flow path (47) toward the outlet (58*b*) of the cathode flow path (47), through the exhaust gas recirculation path.

The present invention is not limited to the above-described embodiments, and it goes without saying that various alternative or additional configurations could be adopted therein based on the content recorded in the Specification.

What is claimed is:

1. A method of starting operation of a fuel cell system including an exhaust gas recirculation pump provided in an exhaust gas recirculation path that allows an oxygen-containing exhaust gas to circulate from an outlet of a cathode flow path of a fuel cell stack to an inlet of the cathode flow path,
    wherein there are provided a high-voltage battery, an air pump, a low-voltage battery, and a fuel tank, wherein the high-voltage battery has a higher voltage than the low-voltage battery,
    the method of starting operation of the fuel cell system, comprising:
    a step of detecting an open circuit voltage of the high-voltage battery when operation of the fuel cell system is started;
    a power generation start step of, when the detected open circuit voltage is less than a threshold voltage at which the air pump is able to be driven, driving the exhaust gas recirculation pump by the low-voltage battery to suck in atmosphere, supplying the atmosphere to the fuel cell stack as oxygen-containing gas, and supplying fuel gas to the fuel cell stack from the fuel tank, thereby starting power generation;
    a power generation continuation step of continuing the power generation by using the exhaust gas recirculation pump until the open circuit voltage of the high-voltage battery becomes the threshold voltage; and
    a main power generation step of, when the open circuit voltage of the high-voltage battery has become the threshold voltage, stopping the exhaust gas recirculation pump, driving the air pump by the high-voltage battery, and supplying oxygen-containing gas needed for power generation of the fuel cell stack from the air pump.

2. The method of starting operation of the fuel cell system according to claim 1, wherein
    an air intake valve is provided in an oxygen-containing exhaust gas discharge path or an oxygen-containing gas supply path of the fuel cell stack, and
    the air intake valve is opened to supply oxygen-containing gas to the fuel cell stack, from the power generation start step until the open circuit voltage of the high-voltage battery becomes the threshold voltage.

3. The method of starting operation of the fuel cell system according to claim 2, further comprising, before the power generation start step in which the air intake valve is opened, a preliminary driving step for the exhaust gas recirculation pump of driving the exhaust gas recirculation pump, and in the preliminary driving step, oxygen-containing gas remaining in the cathode flow path is caused to circulate.

4. The method of starting operation of the fuel cell system according to claim 1, wherein
    when driving the exhaust gas recirculation pump, the exhaust gas recirculation pump is driven in a manner to circulate the oxygen-containing gas in reverse from the inlet of the cathode flow path toward the outlet of the cathode flow path, through the exhaust gas recirculation path, until when the power generation continuation step is started.

5. The method of starting operation of the fuel cell system according to claim 4, wherein
    in a case where the exhaust gas recirculation pump is a type of pump configured not to rotate in reverse, a directional control valve is installed, and the directional control valve is switched in a manner to circulate the oxygen-containing gas in reverse from the inlet of the cathode flow path toward the outlet of the cathode flow path, through the exhaust gas recirculation path.

* * * * *